US012675476B2

(12) United States Patent
Li

(10) Patent No.: US 12,675,476 B2
(45) Date of Patent: Jul. 7, 2026

(54) DATA QUERY METHOD, DATA QUERY APPARATUS, AND COMPUTER-PROGRAM PRODUCT

(71) Applicant: BOE Technology Group Co., Ltd., Beijing (CN)

(72) Inventor: Ang Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 188 days.

(21) Appl. No.: 18/004,886

(22) PCT Filed: Dec. 20, 2021

(86) PCT No.: PCT/CN2021/139567
§ 371 (c)(1),
(2) Date: Jan. 10, 2023

(87) PCT Pub. No.: WO2023/115252
PCT Pub. Date: Jun. 29, 2023

(65) Prior Publication Data
US 2024/0241881 A1     Jul. 18, 2024

(51) Int. Cl.
*G06F 16/2453*          (2019.01)
*G06F 16/242*           (2019.01)
*G06F 16/2455*          (2019.01)

(52) U.S. Cl.
CPC .... *G06F 16/24535* (2019.01); *G06F 16/2448* (2019.01); *G06F 16/2456* (2019.01)

(58) Field of Classification Search
CPC ........... G06F 16/24535; G06F 16/2448; G06F 16/2456
See application file for complete search history.

(56) References Cited

U.S. PATENT DOCUMENTS

| | | | | |
|---|---|---|---|---|
| 7,143,107 B1 * | 11/2006 | Nebres, Jr. | .......... | G06F 16/2423 |
| | | | | 707/999.005 |
| 7,512,713 B2 * | 3/2009 | Wang | .................... | G06F 16/258 |
| | | | | 715/209 |
| 8,005,870 B1 * | 8/2011 | Bedell | ................. | G06F 16/2428 |
| | | | | 706/45 |

(Continued)

FOREIGN PATENT DOCUMENTS

| | | |
|---|---|---|
| CN | 104657439 A | 5/2015 |
| CN | 107491454 A | 12/2017 |

(Continued)

OTHER PUBLICATIONS

International Search Report & Written Opinion mailed Aug. 24, 2022, regarding PCT/CN2021/139567.

*Primary Examiner* — Ajay M Bhatia
*Assistant Examiner* — Zuheir A Mheir
(74) *Attorney, Agent, or Firm* — Intellectual Valley Law, P.C.

(57) ABSTRACT
A data query method is provided. The data query method includes receiving query description; processing, by a processor, the query description using one or more components; and determining query statement. Processing the query description includes obtaining query field from the query description; processing the query field using the one or more components; and determining a first sub-statement.

19 Claims, 5 Drawing Sheets

(56) References Cited

U.S. PATENT DOCUMENTS

| | | | | | |
|---|---|---|---|---|---|
| 8,375,014 | B1 * | 2/2013 | Brocato | | G06F 16/213 |
| | | | | | 707/705 |
| 8,463,736 | B2 * | 6/2013 | Bakalash | | C03B 37/02718 |
| | | | | | 707/769 |
| 8,868,537 | B1 * | 10/2014 | Colgrove | | G06F 16/951 |
| | | | | | 707/706 |
| 10,346,397 | B2 * | 7/2019 | Khuong | | G06F 16/24568 |
| 11,216,454 | B1 * | 1/2022 | Cole | | G06F 8/30 |
| 11,416,528 | B2 * | 8/2022 | Pal | | G06F 16/24554 |
| 2005/0091238 | A1 * | 4/2005 | Zane | | G06F 16/24544 |
| 2010/0082671 | A1 * | 4/2010 | Li | | G06F 16/2456 |
| | | | | | 707/E17.01 |
| 2015/0278334 | A1 * | 10/2015 | Gerweck | | G06F 16/283 |
| | | | | | 707/706 |
| 2017/0193061 | A1 * | 7/2017 | Visbal | | G06F 40/186 |
| 2018/0081938 | A1 * | 3/2018 | Khuong | | G06F 16/256 |
| 2018/0089258 | A1 * | 3/2018 | Bhattacharjee | | G06F 16/24535 |
| 2019/0197153 | A1 * | 6/2019 | Brewinski | | G06F 16/2456 |
| 2019/0228014 | A1 * | 7/2019 | Liu | | G06F 16/2456 |
| 2020/0125559 | A1 * | 4/2020 | Talbot | | G06F 16/26 |
| 2020/0192907 | A1 * | 6/2020 | Weddeling | | G06F 16/242 |
| 2020/0250184 | A1 * | 8/2020 | Frampton | | H04L 63/14 |
| 2021/0311942 | A1 * | 10/2021 | Li | | G06F 16/24524 |
| 2021/0319023 | A1 * | 10/2021 | Ding | | G06F 16/24544 |
| 2022/0058517 | A1 * | 2/2022 | Cherry | | G06Q 40/12 |
| 2023/0082446 | A1 * | 3/2023 | Zilio | | G06F 16/24561 |
| | | | | | 707/769 |
| 2023/0229658 | A1 * | 7/2023 | Newman | | G06F 16/24552 |
| | | | | | 707/713 |

FOREIGN PATENT DOCUMENTS

| | | |
|---|---|---|
| CN | 108446289 A | 8/2018 |
| CN | 109542953 A | 3/2019 |
| CN | 111125178 A | 5/2020 |
| CN | 111782923 A | 10/2020 |
| CN | 112364047 A | 2/2021 |
| CN | 112632110 A | 4/2021 |
| CN | 112699141 A | 4/2021 |
| CN | 113568923 A | 10/2021 |
| CN | 113688176 A | 11/2021 |
| WO | 2016149834 A1 | 9/2016 |

* cited by examiner

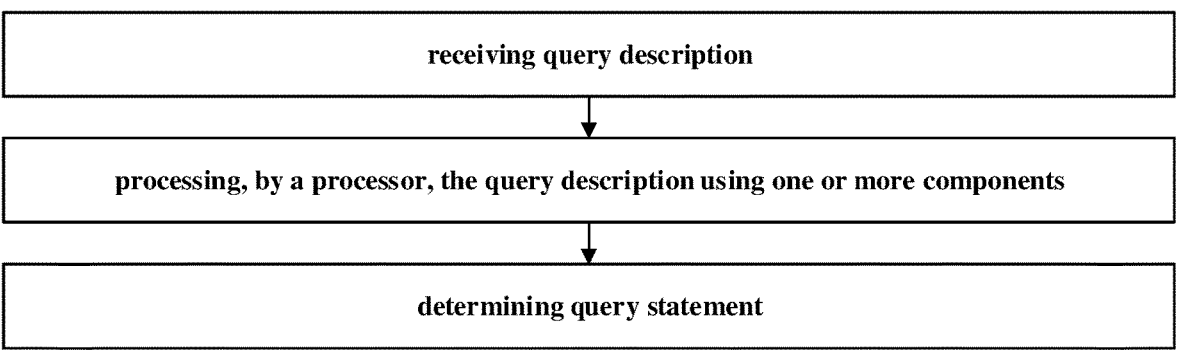

| receiving query description |
| --- |

| processing, by a processor, the query description using one or more components |
| --- |

| determining query statement |
| --- |

FIG. 1

| receiving query description |
| --- |

| obtaining query field from the query description | obtaining filter type field from the query description | obtaining classification field from the query description | obtaining order field from the query description |
| --- | --- | --- | --- |

| processing the query field using the one or more components | processing the filter type field using one or more components | | |
| --- | --- | --- | --- |

| determining a first sub-statement | determining a second sub-statement | determining a third sub-statement | determining a fourth sub-statement |
| --- | --- | --- | --- |

| joining multiple sub-statements including the first sub-statement into the query statement |
| --- |

FIG. 2A

DATA QUERY METHOD, DATA QUERY APPARATUS, AND COMPUTER-PROGRAM PRODUCT

CROSS-REFERENCE TO RELATED APPLICATION

This application is a national stage application under 35 U.S.C. § 371 of International Application No. PCT/CN2021/139567, filed Dec. 20, 2021, the contents of which are incorporated by reference in the entirety.

TECHNICAL FIELD

The present invention relates to display technology, more particularly, to a data query method, a data query apparatus, and a computer-program product.

BACKGROUND

Traditional data query methods require developing software tailored for specific customer needs, each of which would require an extended period of development time. These traditional data query methods also lack flexibility in allowing the user to define rules. In addition, some traditional data query methods require storing data locally, making the data query process rather bulky.

SUMMARY

In one aspect, the present disclosure provides a data query method, comprising receiving query description; processing, by a processor, the query description using one or more components; and determining query statement; wherein processing the query description comprises obtaining query field from the query description; processing the query field using the one or more components; and determining a first sub-statement.

Optionally, processing the query description comprises determining whether the query field comprises an aggregate query field; and processing the aggregate query field using a first component; wherein the first component is configured to provide implementations for a same type of aggregation function that are defined differently by different data sources.

Optionally, processing the query description comprises determining whether the query field comprises a time data query field; and processing the time data query field using a second component; wherein the second component is configured to provide implementations for different formats or types of time data in different data sources.

Optionally, processing the query description comprises determining whether the query field comprises a time data query field; processing the time data query field using a second component; determining whether the query field comprises an aggregate query field; and subsequent to processing the time data query field using the second component, processing the aggregate query field using a first component; wherein the first component is configured to provide implementations for a same type of aggregation function that are defined differently by different data sources; and the second component is configured to provide implementations for different formats or types of time data in different data sources.

Optionally, processing the query description further comprises obtaining filter type field from the query description;

processing the filter type field using one or more components; and determining a second sub-statement.

Optionally, processing the filter type field comprises at least one of processing filter type field using a third component to generate a first filter sub-statement configured to filter character type fields; processing filter type field using a fourth component to generate a second filter sub-statement configured to filter numeric type fields; or processing filter type field using a fifth component to generate a third filter sub-statement configured to filter date data type fields; wherein the second sub-statement comprises at least one of the first filter sub-statement, the second filter sub-statement, or the third filter sub-statement.

Optionally, the data query method further comprises obtaining filter condition field from the query description; or obtaining data source type from the query description.

Optionally, the data query method further comprises obtaining classification field from the query description; and determining a third sub-statement.

Optionally, the data query method further comprises obtaining order field from the query description; and determining a fourth sub-statement.

Optionally, determining query statement comprises joining multiple sub-statements including the first sub-statement into the query statement.

Optionally, the data query method further comprises loading the query statement onto a query engine; and querying a data source, by the query engine, to obtain query result.

Optionally, the data query method further comprises determining whether the query engine supports the data source; determining whether querying the data source comprises a multi-table query; upon a determination that querying the data source comprises the multi-table query, splitting the multi-table query into multiple single-table queries; and assembling query results from the multiple single-table queries.

Optionally, the data query method further comprises loading an interface of a respective component of the one or more components onto a memory; and obtaining respective implementations of the respective component from the interface of the respective component.

Optionally, the data query method further comprises determining the query description; wherein determining the query description comprises defining at least one of the query field, filter type field, filter condition field, and order field.

Optionally, the data query method further comprises defining the one or more components; wherein a respective component of the one or more components is defined to comprise a plurality of interfaces compatible with different data sources; the respective component is configured to provide implementations for different formats or types of data in the different data sources.

Optionally, the one or more components comprise at least one user-defined component.

Optionally, the query engine is a Presto query engine.

Optionally, the query statement is a SQL statement.

In another aspect, the present disclosure provides a data query apparatus, comprising a memory; one or more processors; wherein the memory and the one or more processors are connected with each other; and the memory stores computer-executable instructions for controlling the one or more processors to receive query description; process the query description using one or more components; and determine query statement; wherein the one or more processors are configured to obtain query field from the query description; process the query field using the one or more components; and determine a first sub-statement.

In another aspect, the present disclosure provides a computer-program product comprising a non-transitory tangible computer-readable medium having computer-readable instructions thereon, the computer-readable instructions being executable by a processor to cause the processor to perform receiving query description; processing the query description using one or more components; and determining query statement; wherein processing the query description comprises obtaining query field from the query description; processing the query field using the one or more components; and determining a first sub-statement.

BRIEF DESCRIPTION OF THE FIGURES

The following drawings are merely examples for illustrative purposes according to various disclosed embodiments and are not intended to limit the scope of the present invention.

FIG. 1 is a flow chart illustrating a data query method in some embodiments according to the present disclosure.

FIG. 2A is a flow chart illustrating a data query method in some embodiments according to the present disclosure.

DETAILED DESCRIPTION

Figure 2B:
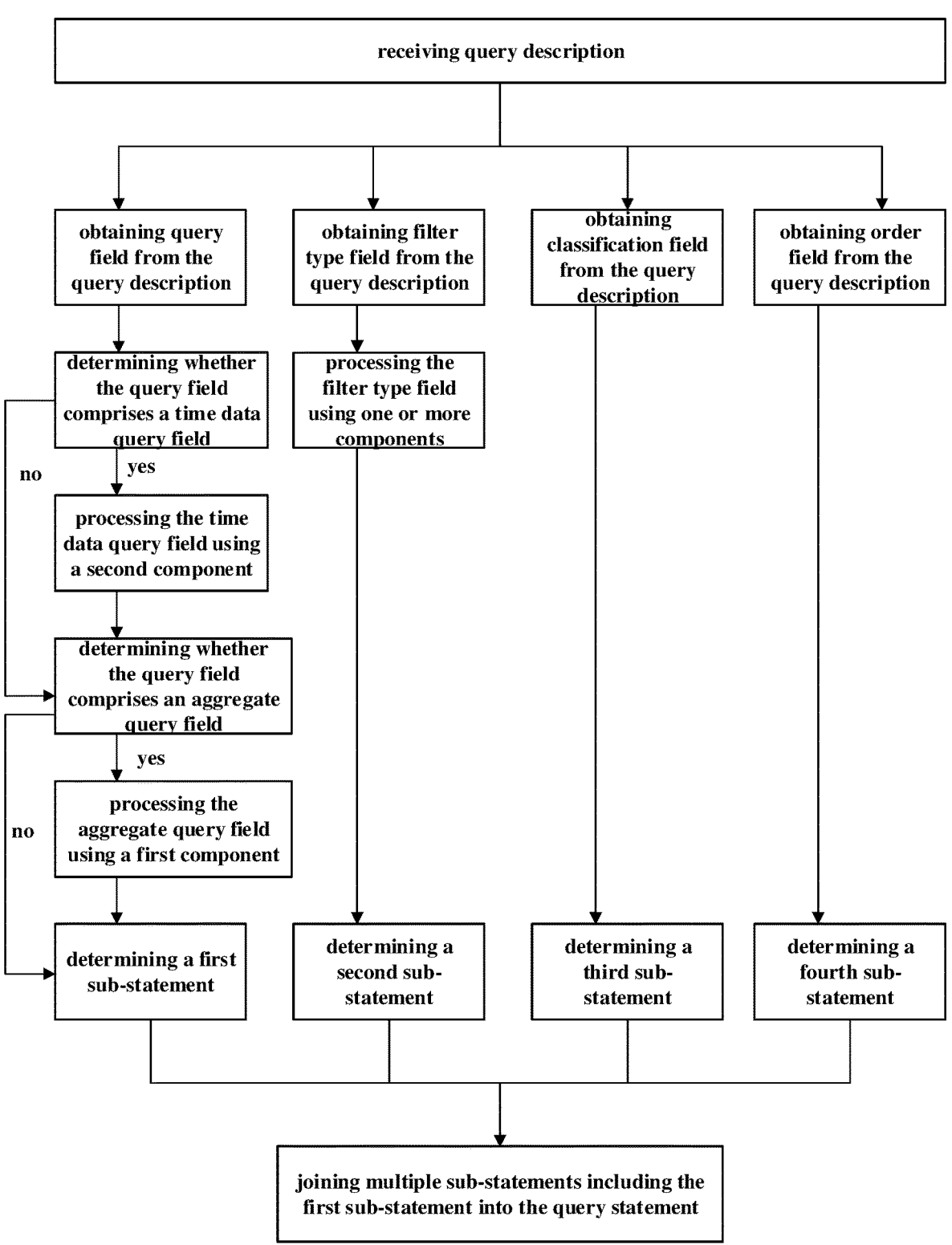
FIG. 2B is a flow chart illustrating a data query method in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a data query method, a data query apparatus, and a computer-program product that substantially obviate one or more of the problems due to limitations and disadvantages of the related art. In one aspect, the present disclosure provides a data query method. In some embodiments, the data query method includes receiving query description; processing, by a processor, the query description using one or more components; and determining query statement. Optionally, processing the query description includes obtaining query field from the query description; processing the query field using the one or more components; and determining a first sub-statement. The present data query method allows a user to self-define query rules, and supports a variety of data sources of different formats, enabling cross-data source data query and analysis.

FIG. 1 is a flow chart illustrating a data query method in some embodiments according to the present disclosure. FIG. 2A is a flow chart illustrating a data query method in some embodiments according to the present disclosure. Referring to FIG. 1 and FIG. 2A, the data query method in some embodiments includes receiving query description; processing, by a processor, the query description using one or more components; and determining query statement. In some embodiments, the query description may be submitted by a user at a front-end application, e.g., through a user interface. In one example, dynamic query conditions such as the query description received at the front-end are interpreted into corresponding query information, based on different data source types, to generate the query statement. The query statement is then transmitted to a query engine for executing the data query.

In some embodiments, the query description includes one or more fields for interpretation by the one or more components. Examples of fields of the query description includes query field, filter type field, classification field, and order field. In one example, the data query method is performing a query and analysis on vehicles. An example of query field may be "vehicle models". An example of filter type field may be "compact size". The filter type field is used for filtering the data. An example of classification field may be "passenger car" or "carriage truck". An example of order field may be "ASC", which denotes an ascending order.

As used herein, the term "component" refers to a computer-related entity, for example, a process running on a processor. In the present data query method, the one or more component includes at least one user-defined component. The term "user-defined" refers to that one or more aspects may be specified by a user, for example, prior to the runtime or at runtime. The one or more aspect that may be user-defined include, for example, time data type, time data format, aggregation function parameter, aggregation function name, character type field filter, numeric type field filter, and date data type field filter.

The present method enables data query and analysis across multiple data sources. Different data sources may have different data description formats, whereas the query engine uses a query statement (for example, SQL statement) that may be compatible with data description format of one data source but incompatible with data description format of another. To decouple data description from query statement of the query engine, the present method introduce at least one user-defined component that are configured to process data descriptions from different data sources into a uniform query statement, thereby enabling dynamic generation of query statement.

Various appropriate user-defined components may be implemented in the present data query method. The components may be defined according to the types of the data sources. In some embodiments, the user-defined components may include a time data component configured to provide implementations for different formats or types of time data in different data sources. For example, the time data component may be configured to convert various time data formats into a uniform format. In one example, different data sources may use different time data formats such as year, month, week, day, hour, minute, or second; and the time data component is configured convert different formats into the uniform format. In another example, the time data component may be configured to convert various time data types (e.g., time stamp data or character string data) into a uniform type.

In some embodiments, the user-defined components may include an aggregation component configured to provide implementations for a same type of aggregation function that are defined differently by different data sources. In one example, different data sources may use different aggregation function names and/or aggregation function parameters for a same aggregation function. The user-defined aggregation component enables implementations for the same type of aggregation function.

In some embodiments, the user-defined components may include a filter component configured to provide implementations for a filter type field. In one example, the user-defined components may include a character filter component, which is configured to process filter type field to generate a filter sub-statement configured to filter character type fields. The implementations provided by the character filter component in some embodiments enables fuzzy matching and/or enumeration during data query. In another example, the user-defined components may include a numeric filter component, which is configured to process filter type field to generate a filter sub-statement configured to filter numeric type fields. In another example, the user-defined components may include a date data filter component, which is configured to process filter type field to generate a filter sub-statement configured to filter date data type fields.

Referring to FIG. 2A, the step of processing the query description in some embodiments includes obtaining query field from the query description; processing the query field using the one or more components; and determining a first sub-statement. In some embodiments, the step of processing the query description includes determining whether the query field comprises an aggregate query field. Upon a determination that the query field comprises an aggregate query field, the method further includes processing the aggregate query field using a first component. The first component is configured to provide implementations for a same type of aggregation function that are defined differently by different data sources. The term "aggregation function" as used herein refers to queries that may contain functions that return aggregate values instead of individual records. Examples of aggregation functions include, but are not limited to, AVG (average), SUM (sum), MAX (maximum value), RMS (root mean square), or the like.

In some embodiments, the step of processing the query description includes determining whether the query field comprises a time data query field; and processing the time data query field using a second component. The second component is configured to provide implementations for different formats or types of time data in different data sources. Upon a determination that the query field comprises a time data query field, the method further includes processing the time data query field using a second component. The second component is configured to provide implementations for different formats or types of time data in different data sources.

Referring to FIG. 2A, the step of processing the query description in some embodiments further includes obtaining filter type field from the query description; processing the filter type field using one or more components; and determining a second sub-statement. Examples of filter type fields include character type fields (filter by characters), numeric type fields (filter by numbers), and date data type fields (filter by dates). As discussed above, the user-defined components may include a character filter component, a numeric filter component, or a date data filter component. Accordingly, in some embodiments, the step of processing the filter type field includes at least one of processing filter type field using a third component to generate a first filter sub-statement configured to filter character type fields; processing filter type field using a fourth component to generate a second filter sub-statement configured to filter numeric type fields; or processing filter type field using a fifth component to generate a third filter sub-statement configured to filter date data type fields. The second sub-statement includes at least one of the first filter sub-statement, the second filter sub-statement, or the third filter sub-statement.

In some embodiments, the data query method further includes obtaining filter condition field from the query description. One example of filter condition is filtering by a single condition. Another example of filter condition is filtering by multiple conditions. Further, the filter condition may be assigned a value such as "containing" or "excluding". In one example, the filter condition is filtering by containing a single condition. In another example, the filter condition is filtering by excluding a single condition. In one example, the filter condition is filtering by containing multiple conditions. In another example, the filter condition is filtering by excluding multiple conditions. In another example, the filter condition is filtering by containing one or more conditions and excluding one or more conditions.

In some embodiments, the data query method further includes obtaining data source type from the query description.

Referring to FIG. 2A, the step of processing the query description in some embodiments further includes obtaining classification field from the query description; and determining a third sub-statement. In one example, the query results may be classified according to the classification field. As discussed above, in one example, classification fields may include "passenger car" or "carriage truck". The query results obtained using the query field "vehicle models" may be classified by "passenger car" or "carriage truck".

Referring to FIG. 2A, the step of processing the query description in some embodiments further includes obtaining order field from the query description; and determining a fourth sub-statement. Examples of order field include an ascending order and a descending order. The query results may be arranged according to the order field.

Referring to FIG. 2A, the data query method in some embodiments further includes joining multiple sub-statements including the first sub-statement into the query statement. In one example, the method includes joining the first sub-statement, the second sub-statement, the third sub-statement, and the fourth sub-statement into the query statement.

In one example, the query field may be "monthly average revenue." Table 1 illustrates an example of a data source containing information on companies' revenues.

| Company | Revenue (billions) | Month |
|---|---|---|
| A | 100 | January |
| B | 90 | January |
| C | 80 | January |
| D | 70 | January |
| A | 80 | February |
| B | 70 | February |
| C | 60 | February |
| D | 50 | February |

As discussed above, the data query method in some embodiments includes processing the query field using the one or more components; and determining a first sub-statement. An example of a first sub-statement is "select: Company, average monthly revenue in January and February."

As discussed above, the data query method in some embodiments includes processing the filter type field using one or more components; and determining a second sub-statement. An example of a second sub-statement is "where: Company in (A, B, C, D) and Month in (January and February)."

As discussed above, the data query method in some embodiments includes obtaining classification field from the query description; and determining a third sub-statement. An example of a third sub-statement is "group: Company."

As discussed above, the data query method in some embodiments includes obtaining order field from the query description; and determining a fourth sub-statement. An example of a fourth sub-statement is "order: average monthly revenue."

An example of a query statement is "select: Company, average monthly revenue in January and February; where: Company in (A, B, C, D) and Month in (January and February); group: Company; order: average monthly revenue." The query statement may be generated by joining the first sub-statement, the second sub-statement, the third sub-statement, and the fourth sub-statement.

An example of the query result is shown in Table 2:

| Company | Monthly average revenue (January and February) (billions) |
|---|---|
| A | 90 |
| B | 80 |
| C | 70 |
| D | 60 |

In one example as described in relation to Table 1, a query field may be "monthly average revenue." The query field includes both an aggregate query field (average) and a time data query field (monthly). FIG. 2B is a flow chart illustrating a data query method in some embodiments according to the present disclosure. Referring to FIG. 2B, in some embodiments, the step of processing the query description includes determining whether the query field comprises a time data query field; processing the time data query field using a second component upon a determination that the query field comprises a time data query field; determining whether the query field comprises an aggregate query field; and subsequent to processing the time data query field and upon a determination that the query field comprises an aggregate query field, processing the aggregate query field using a first component. The second component is configured to provide implementations for different formats or types of time data in different data sources, and the first component is configured to provide implementations for a same type of aggregation function that are defined differently by different data sources.

As discussed above, in some embodiments, processing the filter type field comprises at least one of processing filter type field using a third component to generate a first filter sub-statement configured to filter character type fields; processing filter type field using a fourth component to generate a second filter sub-statement configured to filter numeric type fields; or processing filter type field using a fifth component to generate a third filter sub-statement configured to filter date data type fields; wherein the second sub-statement comprises at least one of the first filter sub-statement, the second filter sub-statement, or the third filter sub-statement. An example of a second sub-statement is "where: Company in (A, B, C, D) and Month in (January and February), average monthly revenue>60 billions." An example of the first filter sub-statement is "Company in (A, B, C, D)." An example of the third filter sub-statement is "Month in (January and February)." An example of the second filter sub-statement is "average monthly revenue>60 billions."

Upon generation of the query statement, the query may be executed. In some embodiments, the data query method further includes loading the query statement onto a query engine; and querying a data source, by the query engine, to obtain query result. Because the present method decouples data description from query statement of the query engine using user-defined components configured to process data descriptions from different data sources into a uniform query statement, various appropriate query engines may be used in the present data query method. Examples of query engines include Presto®, Apache Drill®, Spark®, Impala®, and so on. In one example, the query engine is a distributed query engine such as a distributed SQL query engine. Distributed SQL query engines such as Presto® does not require data storage. For example, Presto® can support many connectors, and query corresponding databases (e.g., mysql, postgresql, mongodb, and elasticsearch) through these connectors. Moreover, Presto® allows a user to develop additional connectors for additional databases. A Presto® query engine includes a coordinator configured to perform query parsing and worker scheduling, and one or more workers configured to perform query execution and computation.

The query statement may be of various appropriate types, depending on the query engine of choice. In one example, the query statement is a SQL statement such as mysql statement, postgresql statement, oracle statement, influxdb statement, iotdb statement, Cassandra statement. In another example, the query statement is a non-SQL statement such as mongodb statement, elasticsearch statement.

Figure 3:
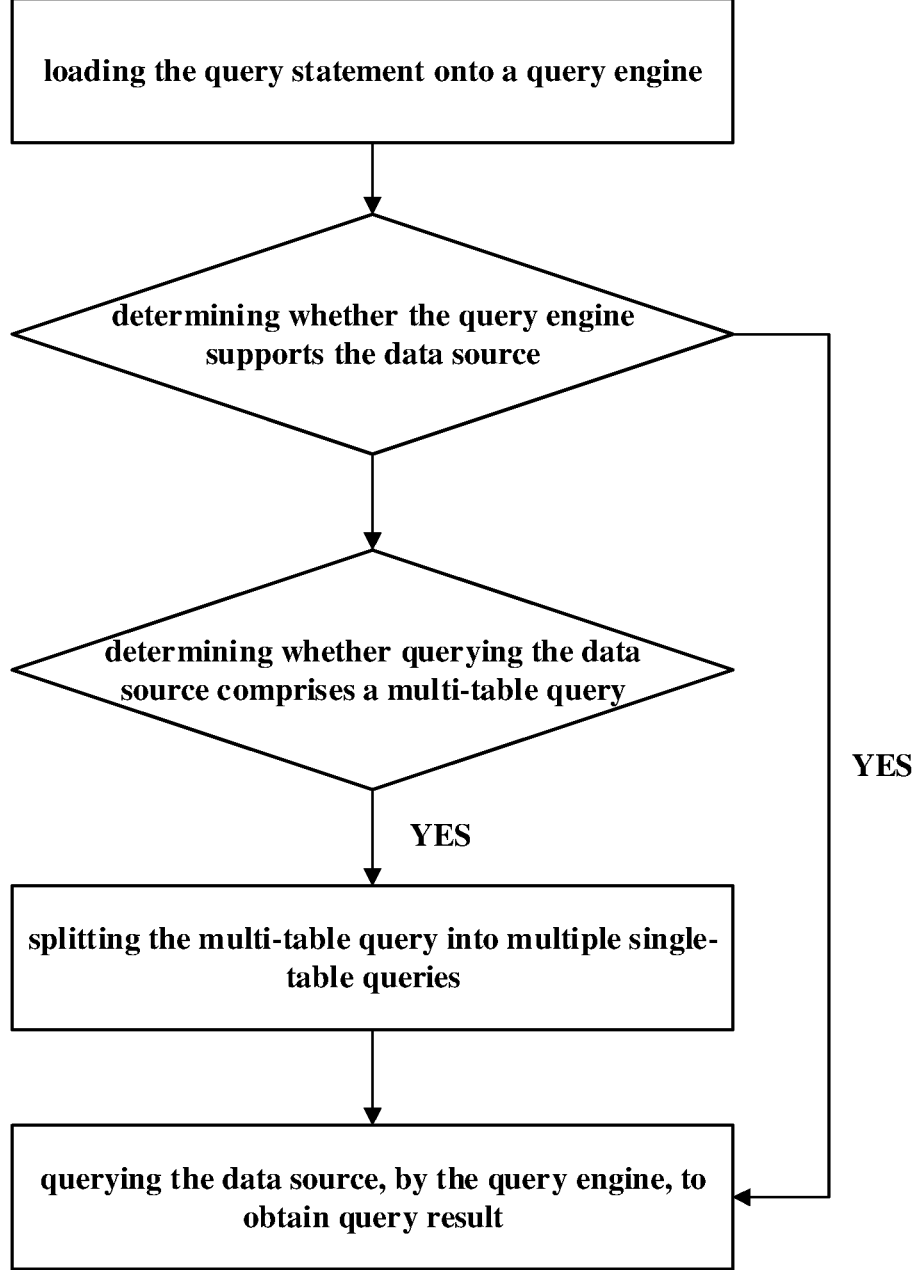
FIG. 3 is a flow chart illustrating a data query method in some embodiments according to the present disclosure.

FIG. 3 is a flow chart illustrating a data query method in some embodiments according to the present disclosure. Referring to FIG. 3, the data query method in some embodiments further includes determining whether the query engine supports the data source. Upon a determination that the query engine supports the data source, the method further includes querying the data source, by the query engine, to obtain query result. Upon a determination that the query engine does not support the data source, the method further includes determining whether querying the data source comprises a multi-table query, e.g., the query involves aggregation function in which values of multiple inputs (e.g., respectively from multiple tables) are grouped together to form a single summary value. Upon a determination that querying the data source comprises a multi-table query, the data query method further includes splitting the multi-table query into multiple single-table queries; and assembling query results from the multiple single-table queries, for example, based on the connecting relationship among the multiple tables.

When a multi-table query is involved, the query description contains information on multiple tables. For example, the information may include identifiers of multiple tables that are linked by the multi-table query, a method of joining the multiple tables, and fields to be kept after the joining. In one specific example, the identifiers for the multiple tables may be ID 100 and ID 200, the joining method may be SQL left-outer-join, fields to be kept for Table ID 100 may include "id", "code", "name_1", "name_2", "name_3", "name_4", and fields to be kept for Table ID 200 may include "id", "code", "name", "value", "update_time".

The present data query method enables multi-table query, significantly enhancing the flexibility of the data query method. As a result, the present data query method is capable of handling high complicated data query scenarios. In particular, the present data query method can process many-to-many relationship in the query process. The present data query method obviates the needs of creating a single table that is required to contain a large amount of data, greatly reducing data redundancy in the data sources.

Figure 4:
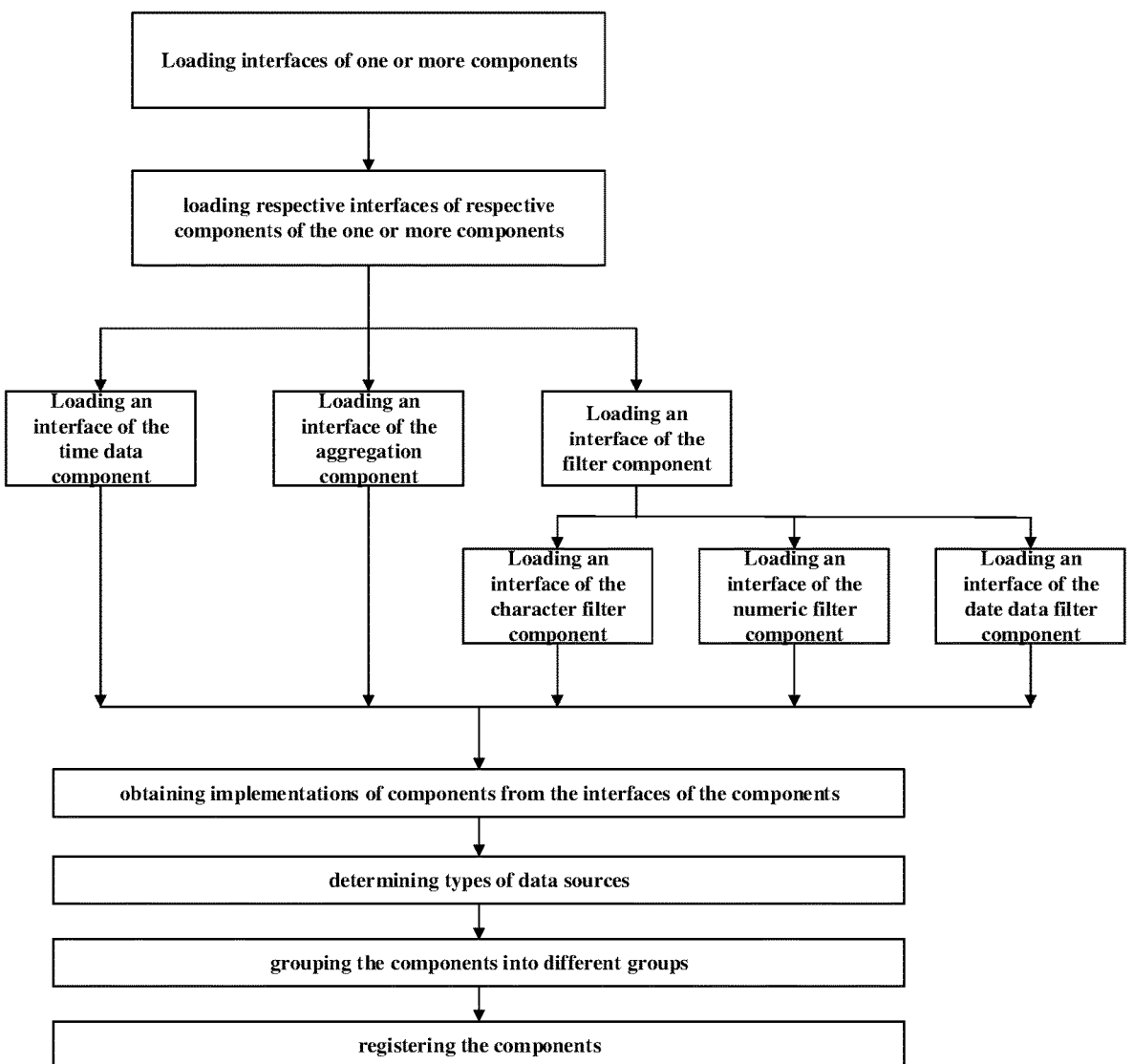
FIG. 4 is a flow chart illustrating a data query method in some embodiments according to the present disclosure.

Prior to processing the query description using one or more components, the data query method in some embodiments further includes loading the one or more components. Typically, the loading occurs at the startup of the query. In some embodiments, the data query method further includes loading an interface of a respective component of the one or more components onto a memory; and obtaining respective implementations of the respective component from the interface of the respective component. FIG. 4 is a flow chart illustrating a data query method in some embodiments according to the present disclosure. Referring to FIG. 4, in one example, the data query method includes accessing interfaces of one or more components, thereby accessing respective interfaces of respective components of the one or more components onto a memory. Specifically, the data query method includes at least one of loading an interface of the time data component, loading an interface of the aggregation component, or loading an interface of the filter component. More specifically, loading the interface of the filter component may include at least one of loading an interface of the character filter component, loading an interface of the numeric filter component, or loading an interface of the date data filter component.

In one specific example, the data query method includes loading an interface of a top-level interface of a respective component; obtaining implementations of the top-level interface and any lower-level interfaces associated with the top-level interface from the top-level interface; and classifying the implementations obtained. Numerous advantages over other methods may be achieved by this unique manner of interface loading. For example, this interface loading method eliminates the need for repetitively establishing interface implementations, enabling effective reuse of computational resource, and significantly improving call execution efficiency.

Once the interfaces are loaded onto the memory, the data query method further includes obtaining implementations of components from the interfaces of the components. Optionally, the data query method further includes determining types of data sources; grouping the components into different groups; and registering the components. As used herein, an interface refers to a set of operations (e.g., names of functions) that declares a service convention or protocol provided or requested by a component. As used herein, the term implementation refers to functions that implement the interface of the component. An interface may contain different implementations corresponding to different data sources. To illustrate, in one example, the interface may be "driving a vehicle," and the interface may include a set of operations such as acceleration, deceleration, changing gears, turning on lights, and so on. In one example, implementations corresponding to "acceleration" operation may include "using a user's right foot to" "step on gas" "steadily", and so on.

As discussed above, the data query method in some embodiments includes loading an interface of the time data component. In one example, the interface of the time data component may be "Month." In another example, the implementation of the interface may be "converting time data into yyyy-mm format." For example, the time data in a data source may have a format of "yyyy-mm-dd hh:mm:ss," the time data component converts the format into the "yyyy-mm format."

As discussed above, the data query method in some embodiments includes loading an interface of the aggregation component. In one example, the interface of the aggregation component may be an averaging operation, and the corresponding implementation may be adding an averaging function to a value. For example, the aggregation component is configured to add an averaging function to "revenue," converting it into a "avg(revenue)" statement.

As discussed above, the data query method in some embodiments includes loading an interface of the character filter component. In one example, the interface of the character filter component may be an operation to filter character and conditions, and assemble the character and condition into a statement. For example, the character filter component is configured to filter character and conditions to obtain "Company" and "(A, B, C, D)", and assemble them into a statement "Company in (A, B, C, D)."

As discussed above, the data query method in some embodiments includes loading an interface of the numeric filter component. In one example, the interface of the numeric filter component may be an operation to filter numeric data, and assemble the numeric data into a statement. For example, the numeric filter component is configured to filter "avg(revenue)" greater than a threshold value 60 billions, and assemble the numeric data into a statement "avg(revenue)>60 billions."

As discussed above, the data query method in some embodiments includes loading an interface of the date data filter component. In one example, the interface of the date data filter component may be an operation to filter date data, and assemble the date data into a statement. For example, the date data filter component is configured to filter date data to obtain "Month" and "(January, February)", and assemble them into a statement "Month in (January, February)."

In some embodiments, the results of processing using the interface of the aggregation component and/or the interface of the aggregation component may be used in the processing using the interfaces of the numeric filter components. For example, "Company" and "avg(revenue)" may be used in the processing using the interfaces of the numeric filter components.

In some embodiments, the data query method further includes determining the query description. Optionally, the step of determining the query description includes defining at least one of the query field, filter type field, filter condition field, and order field.

In some embodiments, the data query method further includes defining the one or more components. A respective component of the one or more components is defined to comprise a plurality of interfaces compatible with different data sources. The respective component is configured to provide implementations for different formats or types of data in the different data sources.

In another aspect, the present disclosure provides a data query apparatus. In some embodiments, the data query apparatus includes a memory; and one or more processors. The memory and the one or more processors are connected with each other. In some embodiments, the memory stores computer-executable instructions for controlling the one or more processors to receive query description; process the query description using one or more components; and determine query statement. Optionally, the one or more processors are configured to obtain query field from the query description; process the query field using the one or more components; and determine a first sub-statement.

Figure 5:
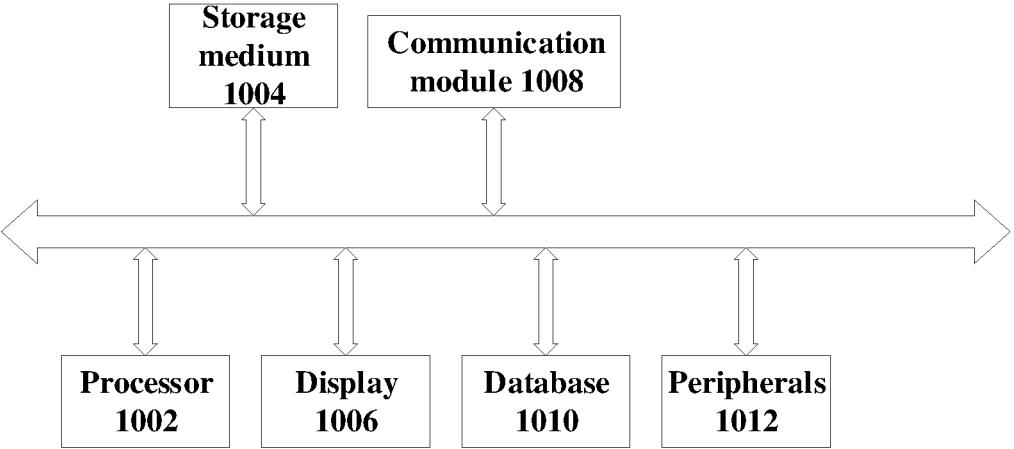
FIG. 5 is a schematic diagram illustrating a data query apparatus in some embodiments according to the present disclosure.

FIG. 5 is a schematic diagram illustrating a data query apparatus in some embodiments according to the present disclosure. Referring to FIG. 5, the data query apparatus may include any appropriate type of TV, such as a plasma TV, a liquid crystal display (LCD) TV, a touch screen TV, a projection TV, a non-smart TV, a smart TV, etc. The data query apparatus may also include other computing systems, such as a personal computer (PC), a tablet or mobile computer, or a smart phone, etc. In addition, the data query apparatus may be any appropriate content-presentation device capable of presenting any appropriate content. Users may interact with the data query apparatus to perform other activities of interest.

As shown in FIG. 5, the data query apparatus may include a processor 1002, a storage medium 1004, a display 1006, a communication module 1008, a database 1010 and peripherals 1012. Certain devices may be omitted, and other devices may be included to better describe the relevant embodiments.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display device or electronic apparatus display such as LCD or OLED based devices. The peripherals 112 may include various sensors and other I/O devices, such as keyboard and mouse.

All or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information, and which may be accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

In another aspect, the present disclosure provides a computer-program product comprising a non-transitory tangible computer-readable medium having computer-readable instructions thereon. In some embodiments, the computer-readable instructions being executable by a processor to cause the processor to perform receiving query description; processing the query description using one or more components; and determining query statement. Optionally, processing the query description includes obtaining query field from the query description; processing the query field using the one or more components; and determining a first sub-statement.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A data query method, comprising:

receiving query description that specifies at least one data source type and at least one query parameter;

loading an interface of at least one user-defined component onto a memory, obtaining a corresponding implementation of the at least one user-defined component, and grouping obtained implementations based on the at least one data source type;

processing, by a processor, the query description using one or more components, by identifying the at least one data source type and executing data-source-specific operations associated with the at least one data source type to generate query statement that conforms to specified query parameters; and dynamically adjusting the query statement based on the at least one data source type to enhance compatibility and processing efficiency;

wherein processing the query description comprises:

obtaining query field from the query description;

processing the query field using the one or more components;

determining a first sub-statement;

obtaining filter type field from the query description that defines a specific subset of data types within the data source;

processing the filter type field by loading an interface of a dedicated filtering component onto the memory, obtaining its implementation, and processing one or more dedicated filtering components configured to handle character, numeric, or date data types to generate a filter sub-statement that reflects the filtered results in a format compatible with the specified data source; and determining a query statement by joining the first sub-statement with the filter sub-statement.

2. The data query method of claim 1, wherein processing the query description comprises:

determining whether the query field comprises an aggregate query field; and processing the aggregate query field using a first component;

wherein the first component is configured to provide implementations for a same type of aggregation function that are defined differently by different data sources.

3. The data query method of claim 1, wherein processing the query description comprises:

determining whether the query field comprises a time data query field; and processing the time data query field using a second component;

wherein the second component is configured to provide implementations for different formats or types of time data in different data sources.

4. The data query method of claim 1, wherein processing the query description comprises:

determining whether the query field comprises a time data query field;

processing the time data query field using a second component;

determining whether the query field comprises an aggregate query field; and subsequent to processing the time data query field using the second component, processing the aggregate query field using a first component;

wherein the first component is configured to provide implementations for a same type of aggregation function that are defined differently by different data sources; and the second component is configured to provide implementations for different formats or types of time data in different data sources.

5. The data query method of claim 1, wherein processing the filter type field comprises at least one of:

processing filter type field using a third component to generate a first filter sub-statement configured to filter character type fields;

processing filter type field using a fourth component to generate a second filter sub-statement configured to filter numeric type fields; or processing filter type field using a fifth component to generate a third filter sub-statement configured to filter date data type fields;

wherein the filter sub-statement comprises at least one of the first filter sub-statement, the second filter sub-statement, or the third filter sub-statement.

6. The data query method of claim 5, further comprising:

obtaining filter condition field from the query description; or obtaining the at least one data source type from the query description.

7. The data query method of claim 1, further comprising:

obtaining classification field from the query description; and determining a third sub-statement.

8. The data query method of claim 1, further comprising:

obtaining order field from the query description; and determining a fourth sub-statement.

9. The data query method of claim 1, wherein determining query statement comprises joining multiple sub-statements including the first sub-statement into the query statement.

10. The data query method of claim 1, further comprising:

loading the query statement onto a query engine; and querying a data source, by the query engine, to obtain query result.

11. The data query method of claim 10, further comprising:

determining whether the query engine supports the data source;

determining whether querying the data source comprises a multi-table query;

upon a determination that querying the data source comprises the multi-table query, splitting the multi-table query into multiple single-table queries; and assembling query results from the multiple single-table queries.

12. The data query method of claim 10, wherein the query engine is a Presto query engine.

13. The data query method of claim 1, further comprising:

loading an interface of a respective component of the one or more components onto the memory; and obtaining respective implementations of the respective component from the interface of the respective component.

14. The data query method of claim 1, further comprising determining the query description;

wherein determining the query description comprises defining at least one of the query field, filter type field, filter condition field, and order field.

15. The data query method of claim 1, further comprising defining the one or more components;

wherein a respective component of the one or more components is defined to comprise a plurality of interfaces compatible with different data sources;

the respective component is configured to provide implementations for different formats or types of data in the different data sources.

16. The data query method of claim 1, wherein the one or more components comprise at least one user-defined component.

17. The data query method of claim 1, wherein the query statement is a SQL statement.

18. A data query apparatus, comprising:

a memory;

one or more processors;

wherein the memory and the one or more processors are connected with each other; and the memory stores computer-executable instructions for controlling the one or more processors to:

receive query description that specifies at least one data source type and at least one query parameter;

load an interface of at least one user-defined component onto the memory, obtaining a corresponding implementation of the at least one user-defined component, and grouping obtained implementations based on the at least one data source type;

process the query description using one or more components, by identifying the at least one data source type and executing data-source-specific operations associated with the at least one data source type to generate query statement that conforms to specified query parameters; and dynamically adjust query statement based on the at least one data source type to enhance compatibility and processing efficiency;

wherein the one or more processors are configured to:

obtain query field from the query description;

process the query field using the one or more components;

determine a first sub-statement;

obtain filter type field from the query description that defines a specific subset of data types within the data source;

process the filter type field by loading an interface of a dedicated filtering component onto the memory, obtaining its implementation, and processing one or more dedicated filtering components configured to handle character, numeric, or date data types to generate a filter sub-statement that reflects the filtered results in a format compatible with the specified data source; and determine a query statement by joining the first sub-statement with the filter sub-statement.

19. A computer-program product comprising a non-transitory tangible computer-readable medium having computer-readable instructions thereon, the computer-readable instructions being executable by a processor to cause the processor to perform:

receiving query description that specifies at least one data source type and at least one query parameter;

loading an interface of at least one user-defined component onto a memory, obtaining a corresponding implementation of the at least one user-defined component, and grouping obtained implementations based on the at least one data source type;

processing the query description using one or more components, by identifying the at least one data source type and executing data-source-specific operations associated with the at least one data source type to generate query statement that conforms to specified query parameters; and dynamically adjusting the query statement based on the at least one data source type to enhance compatibility and processing efficiency;

wherein processing the query description comprises:

obtaining query field from the query description;

processing the query field using the one or more components;

determining a first sub-statement;

obtaining filter type field from the query description that defines a specific subset of data types within the data source;

processing the filter type field by loading an interface of a dedicated filtering component onto the memory, obtaining its implementation, and processing one or more dedicated filtering components configured to handle character, numeric, or date data types to generate a filter sub-statement that reflects the filtered results in a format compatible with the specified data source; and determining a query statement by joining the first sub-statement with the filter sub-statement.

* * * * *